(12) United States Patent
Giuliani

(10) Patent No.: US 6,571,925 B1
(45) Date of Patent: Jun. 3, 2003

(54) 1-WAY CLUTCH THAT USES LEVERS

(76) Inventor: Robert L. Giuliani, 1456 Thurston Ave., A-1204, Honolulu, HI (US) 96822

( * ) Notice: Subject to any disclaimer, the term of this patent is extended or adjusted under 35 U.S.C. 154(b) by 0 days.

(21) Appl. No.: 09/572,706

(22) Filed: May 16, 2000

(51) Int. Cl.$^7$ ............................................... F16D 41/07
(52) U.S. Cl. ............................................. 192/45.1
(58) Field of Search ........................ 192/41 R, 45.1, 192/45.2; 188/82.4, 82.8

(56) References Cited

U.S. PATENT DOCUMENTS

| | | | | |
|---|---|---|---|---|
| 209,456 A | * | 10/1878 | Burrows | 192/45.1 X |
| 813,396 A | * | 2/1906 | Anker-Holth | 192/41 R |
| 1,235,633 A | * | 8/1917 | Anderson et al. | 192/45.1 |
| 1,902,375 A | * | 3/1933 | Pitter | 192/45.2 |
| 3,216,544 A | * | 11/1965 | Ryan | 192/45.1 |
| 3,638,774 A | * | 2/1972 | Burch et al. | 192/42 |
| 4,126,214 A | * | 11/1978 | Kiss | 192/46 X |

* cited by examiner

Primary Examiner—Richard M. Lorence

(57) ABSTRACT

One or more levers are carried by one of the races, each in its respective recess. The lever's fulcrum is in contact with an arc in the recess. Motion between the inner and outer races is transmitted through the lever and the arc. The transmission is essentially normal to the radial.

Indexing causes the lever to tilt back and forth on its fulcrum, which brings the contact surfaces between the lever's arm and the opposite race into and out of contact. The tilt comes from the angular displacement of a pin carried by the lever's second arm. Motion change in the opposite race causes the angular displacement.

3 Claims, 1 Drawing Sheet

1-WAY CLUTCH THAT USES LEVERS

CROSS-REFERENCE TO RELATED APPLICATIONS

Not applicable

FEDERALLY SPONSORED RESEARCH OR DEVELOPMENT

Not Applicable

BACKGROUND OF THE INVENTION 1-way clutches frequently fail because of well understood mechanical and over heating problems.

SUMMARY

This 1-way clutch uses one or more levers, which are in respective recesses in one of the races. The lever is in slidable contact with an arc in the recess. Motion between the inner and outer races is transmitted through the lever and the arc.

Indexing causes the lever to tilt back and forth on its axis which brings the contact surfaces into and out of contact. The contact surfaces between the lever's arm and the opposite race are made of a non-skid material, such as silicon carbide, so that they instantly stick upon contact when the lever is tilted in the drive direction and instantly separate when the lever is tilted in the overrun direction. The tilt is controlled by the angular displacement of a pin carried by the lever's arm. The objects of this invention include:

1. loose tolerances, easy assembly;
2. high indexing, high loads;
3. other objects will become obvious upon further perusal.

DETAILED DESCRIPTION

Figure 1:
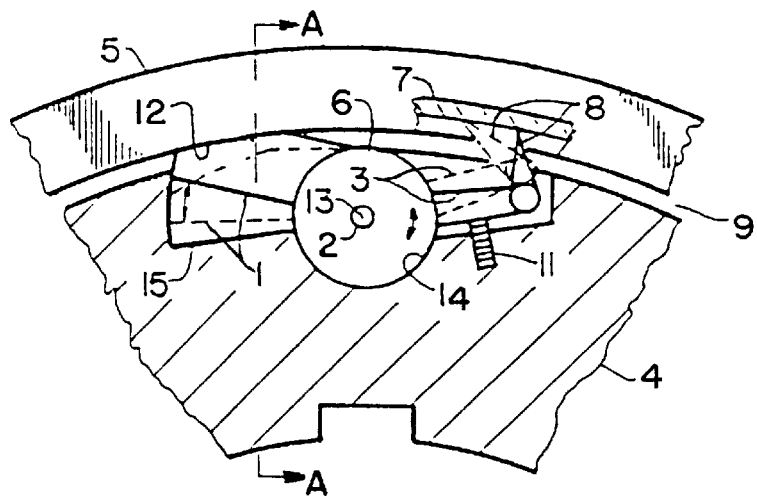
FIG. 1 is a side view showing the two extreme positions of a lever in a recess of the carrying race.

In FIG. 1, outer race 5 is assumed to be the driver and drive is to the right. Alternatively, inner race 4 could be the driver in which case drive is to the left in FIG. 1.

FIG. 1 shows the single piece lever in its recess 15, which is in race 4. The lever consists of arm 1, arm 3 and fulcrum 6. The fulcrum contacts the inner race 4 along the arc 14. Arc 14 is part of the recess 15. Motion is transmitted between the lever and race 4 through arc 14.

Figure 2:
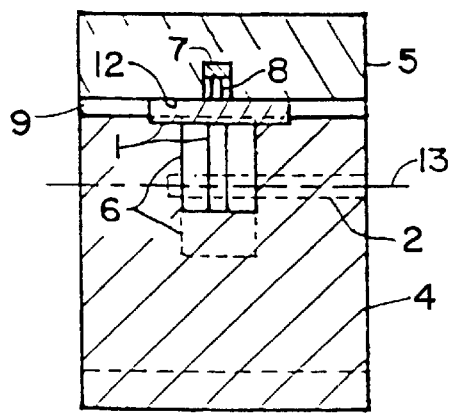
FIG. 2 shows a cross section essentially along A—A in FIG. 1.

The lever oscillates on rod 2, which is centered on axis 13. FIG. 2 shows the rod extending from the side of race 4 through the lever to allow the lever to oscillate about its axis 13 while keeping the lever in its recess 15. The rod is removable to permit changing the lever. The oscillation brings the lever's surface into contact 12 with the race 5 surface during drive and separates them during overrun. The oscillation is controlled by the angular displacement of pin 8, which is caused by changes in the motion of strip 7. See FIG. 1.

The lever arm 3 carries the spring-loaded pin 8. The pin 8 extends across the space 9 between the races to stay in contact with the tough, long wearing strip 7 that is carried by the race 5. The surface of strip 7 is slippery to reduce drag during overrun. The contact surfaces 12 (FIG. 2) never touch the strip 7. The combination arm 3, pin 8 and spring 11 serves to detect motion change in race 5 and instantly respond by tilting the lever on its axis 13.

To overrun, the outer race 5 reverses direction, which is to the left in FIG. 1. FIG. 1 shows the lever's arms and pin 8 by dashed lines during overrun. When the overrun stroke begins, the reversal of race 5 causes pin 8 to instantly tilt in the overrun direction to the position shown, which allows spring 11 to raise the arm 3. That causes the lever to oscillate on its axis 13 and instantly break contact between the arm 1 and race 5. The contact surfaces 12 remain completely separated during overrun.

The pin 8 instantly grabs the strip when reversing to the drive direction, which tilts the pin toward its upright position shown in FIG. 1. That causes the pin to overcome the spring 11 and tilt the arm 3 into its recess 15. The tilt of the arm 3 causes the lever to pivot on its axis 13 and bring the arm 1 and race 5 surfaces 12 into contact. The contact surfaces 12 include silicon carbide or other rugged non-slip material so that the drive force, combined with the force from pin 8 at the end of the arm 3, rigidly locks the two contact surfaces together in the drive direction. The surface contact gets tighter as the drive force increases, which prevents slip, because the force tilts the pin farther toward its upright position. The contact surfaces can be beveled to effect a tighter lock.

Figure 3:
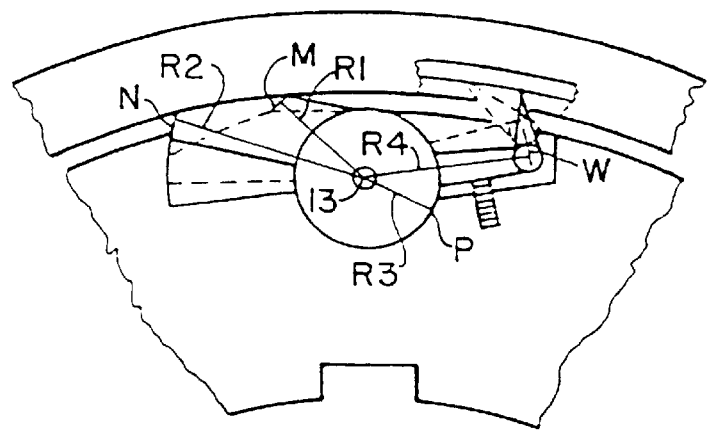
FIG. 3 shows radii to important displacement points as the lever oscillates on its axis.

Certain important arc lengths that simultaneously open or close when the lever oscillates can be easily determined since they are parts of concentric circles centered on axis 13. They are shown in FIG. 3 as M, N, P and W. Arc M, with radius R1, is the closest separation between the contact surfaces 12 during overrun. Arc N, with radius R2, is at the farthest point of separation between the contact surfaces during overrun. Arc P, with radius R3, is along the arc 14. A short arc P is especially important because it reduces friction and wear Between race 4 and the lever. Arc W, with radius R4, controls the lengths of the other arcs.

These formulas are based on choosing the value of arc M and its radius R1:

$N=(M)R2/R1$ $P=(M)R3/R1$ A small M and R3/R1 ratio creates a short arc P.

$W=(M)R4/R1$

The displacement of arm 3, which determines the displacement of all the other arcs, can be easily calculated by knowing the angular displacement of pin 8. The pin 8 displacement can be easily calculated after choosing the value for M.

I claim:

1. A 1-way clutch, the combination comprising;

a first race;

a second race;

the first race carrying a lever;

the lever comprising an arm;

arm further comprising a first contact surface;

the second race comprising a second contact surface;

the lever comprising a second arm; and the second arm detecting change of motion in the second race wherein a reversal in one direction brings the surfaces into contact to effect transmission of motion between the races and a reversal in a second direction brings the surfaces out of contact to prevent the transmission.

2. The combination of claim 1 comprising;

the second arm carrying a pivotal pin; and the pin communicating with the second race wherein the change is detected.

3. The combination of claim 2 wherein;

the second race carries a strip; and the pin communicates with the strip.

\* \* \* \* \*